United States Patent
Abraham et al.

(10) Patent No.: US 7,685,023 B1
(45) Date of Patent: Mar. 23, 2010

(54) METHOD, SYSTEM, AND COMPUTER PROGRAM PRODUCT FOR VIRTUALIZING A PHYSICAL STOREFRONT

(75) Inventors: Subil M. Abraham, Plano, TX (US); Vinod A. Bijlani, Pune (IN); Mathews Thomas, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/343,892

(22) Filed: Dec. 24, 2008

(51) Int. Cl.
*G06Q 30/00* (2006.01)
*G06F 17/30* (2006.01)

(52) U.S. Cl. .......................... 705/26; 705/27
(58) Field of Classification Search .............. 705/26–27
See application file for complete search history.

(56) References Cited

U.S. PATENT DOCUMENTS

| | | | |
|---|---|---|---|
| 6,026,376 A * | 2/2000 | Kenney | 705/27 |
| 6,910,186 B2 | 6/2005 | Kim | |
| 7,155,680 B2 | 12/2006 | Akazawa et al. | |
| 2002/0178072 A1 * | 11/2002 | Gusler et al. | 705/26 |
| 2004/0039583 A1 | 2/2004 | Saito et al. | |
| 2005/0177463 A1 | 8/2005 | Crutchfield, Jr. et al. | |
| 2006/0211482 A1 | 9/2006 | Pimienta et al. | |
| 2007/0273557 A1 * | 11/2007 | Baillot | 340/988 |
| 2008/0014829 A1 | 1/2008 | Dyer et al. | |
| 2008/0091553 A1 * | 4/2008 | Koski | 705/26 |
| 2008/0091692 A1 | 4/2008 | Keith et al. | |
| 2008/0195507 A1 | 8/2008 | Ratnakar | |
| 2009/0106672 A1 * | 4/2009 | Burstrom | 715/757 |

OTHER PUBLICATIONS

"I was Where Woz: Location-Aware Computing". David Mark. Electronic Design. Oct. 28, 2004. vol. 52, No. 24, p. 16, 2 pgs [recovered from Dialog on Oct. 20, 2009].*
Dai, K., et al., "Three Dimensional Online Customization Ordering System," Proc. 8th Int'l. Conf. Computer Supported Cooperative Work in Design, vol. 2, pp. 588-593, IEEE, May 26-28, 2004.
Shen, X., et al., "vCOM: Virtual Commerce in a Collaborative 3D World," Proc. 9th ACM Conf. Multimedia, vol. 9, pp. 605-606, 2001.
Kim, S.M., et al., "CIGMA: Active Inventory Service in Global E-market for Enabling One-stop Shopping over Internet Shopping Sites," IEEE, Proc. 3rd Int'l. Symposium on Electronic Commerce, pp. 65-73, 2002.

* cited by examiner

*Primary Examiner*—Jeffrey A Smith
*Assistant Examiner*—Kathleen Davison
(74) *Attorney, Agent, or Firm*—Patents on Demand, P.A.; Brian K. Buchheit

(57) ABSTRACT

An interactive virtual model of a physical storefront can be presented to a shopper within a user interactive interface of a computing device remotely located from the physical storefront. At least a portion of the organizational structure of the interactive virtual model can be identical a portion of the organizational structure of the physical storefront. The organization structure can varies from storefront-to-storefront of different physical storefronts, each being related to a different interactive virtual model. A change involving at least one physical object within the physical storefront can be sensed. Responsive to sensing the change, a virtual object presented in the interactive virtual model can be changed so that the change to the physical object occurring in the physical storefront is reflected in the interactive virtual model and is shown in the user interactive interface.

19 Claims, 4 Drawing Sheets

METHOD, SYSTEM, AND COMPUTER PROGRAM PRODUCT FOR VIRTUALIZING A PHYSICAL STOREFRONT

BACKGROUND

The present invention relates to the field of e-commerce and, more particularly, to unifying virtual shopping and storefront shopping experiences.

Today's storefront shopping differs from shopping online in many respects even though often times both the storefront and the online store are operated by the same organization. Because of this difference, some customers prefer to shop at storefronts while others prefer online shopping. Storefront shoppers are often hesitant to utilize online stores due to the manner in which they are required to interact. Storefront shoppers are often able to quickly locate products in a retail store, but frequently have trouble finding products in an online store.

Additionally, this disconnect between storefronts and online stores means that collaborative shopping is hindered. For example, an online shopper interested in a product cannot give a friend shopping in the storefront useful information about locating the product in the storefront. Further, shoppers tend to have problems with interaction with online store search engines. For instance, a user may not be able to identify search terms associated with a product they are interested in purchasing. These shortcomings can add up to potential revenue loss and ultimately detract from a positive shopping experience.

DETAILED DESCRIPTION

Figure 1:
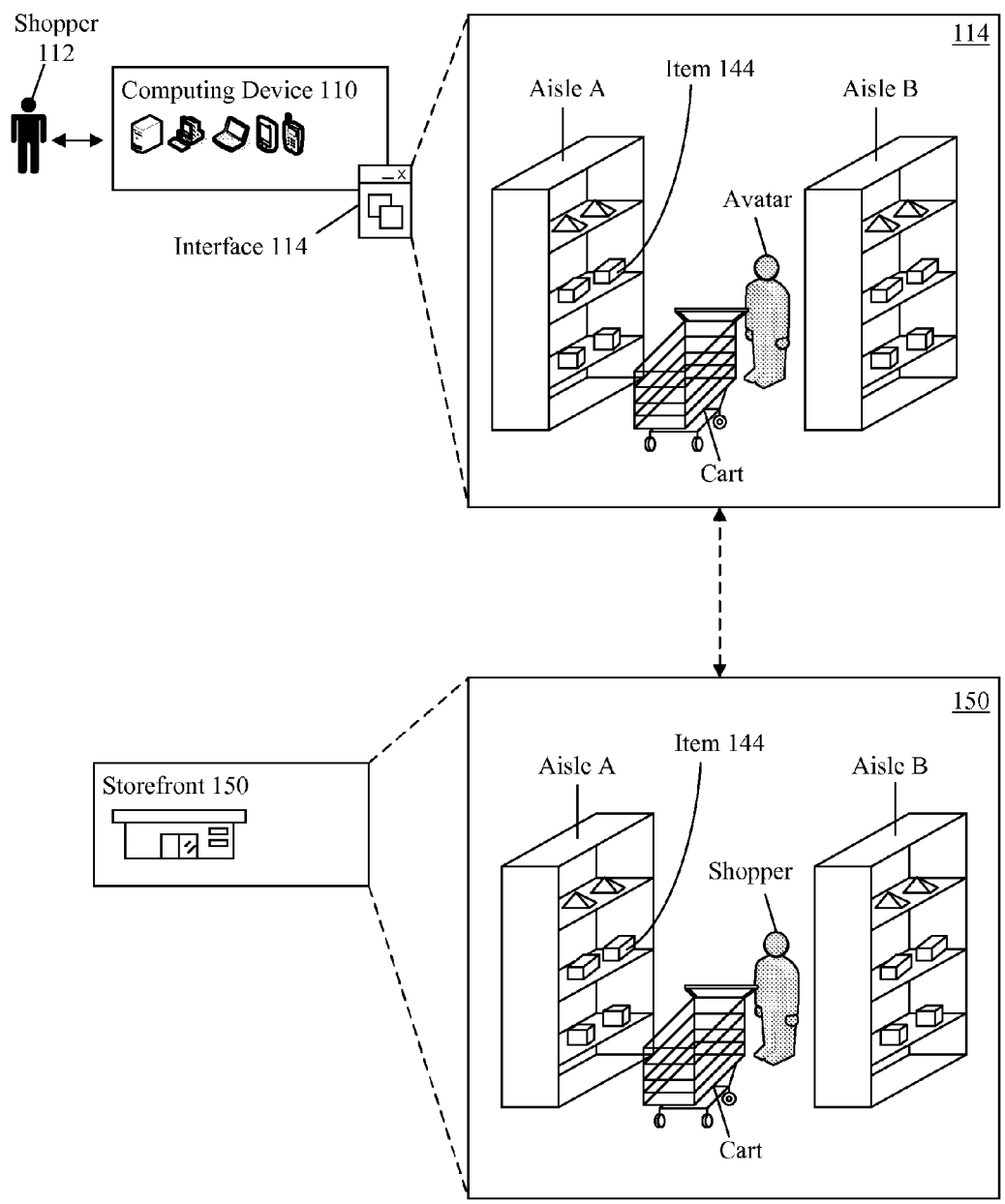
FIG. 1 is a schematic diagram illustrating a scenario of a unified shopping experience between a storefront shopper and a virtual store shopper in accordance with an embodiment of the inventive arrangements disclosed herein.

The present invention discloses a solution for unifying virtual shopping and storefront shopping experiences. In the solution, a real-time virtual storefront representation of a physical storefront can be presented to a virtual storefront shopper within a user interface of a computing device. In one embodiment, the virtual storefront shopper can be presented with a three-dimensional model of the storefront displaying locations of aisles, products, shoppers, shopper kiosks, point-of-sale kiosks, and the like. Utilizing presence technologies, storefront activity (e.g., shoppers, products, etc) can be reflected in the virtual store, which can even occur in real time. For example, if a radio frequency identification (RFID) tagged item is moved from one aisle to another, the new location can be automatically updated within the virtual store. Interfaces in the storefront (e.g., smart carts) and within the virtual store can permit a virtual storefront shopper to communicate with shoppers of the storefront. Communication can include, but is not limited to, voice communication, text exchange, and the like.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a schematic diagram illustrating a scenario 100 of a unified shopping experience between a storefront shopper and a virtual store shopper in accordance with an embodiment of the inventive arrangements disclosed herein. In the scenario, a storefront 150 can be represented as a virtual model presented within interface 114. For example, interface 114 can show a three-dimensional representation of a virtual store, which is approximately equivalent to an actual layout of storefront 150. The interface 114 need not be three-dimensional in all embodiments and system 100 contemplates using other representations so long as layout specifics of a virtual storefront are based upon those of storefront 150. Shopper 112 can interact with interface 114, which can mimic the storefront 150 experience.

Layout and organization structure in storefront 150 can be represented in interface 114. In one embodiment, entities and objects within storefront 150, such as shoppers, movable displays, non-movable displays, carts, and the like, can be represented within interface 114. For instance, a physical item 144 in Aisle A of storefront 150 can be presented as a virtual object within Aisle A in interface 114. In one embodiment, a set of one or more shoppers 112 of an interface can detect a presence of, communicate, and otherwise interact with other virtual shoppers and/or with actual shoppers physically in the storefront 150. In one embodiment, virtual shoppers 112 can interact with in-store employees physically located in storefront 150. In one implementation, real-time or near real time updates can ensure a virtual storefront and a physical storefront 150 are synchronized. In-store kiosks within storefront 150 can exist to facilitate interaction between shoppers in storefront 150 and virtual shoppers interacting with a virtual version of the storefront 150. Further, shoppers present in storefront 150 can utilize mobile electronic devices with networking capabilities to interact with virtual shoppers.

Figure 2:
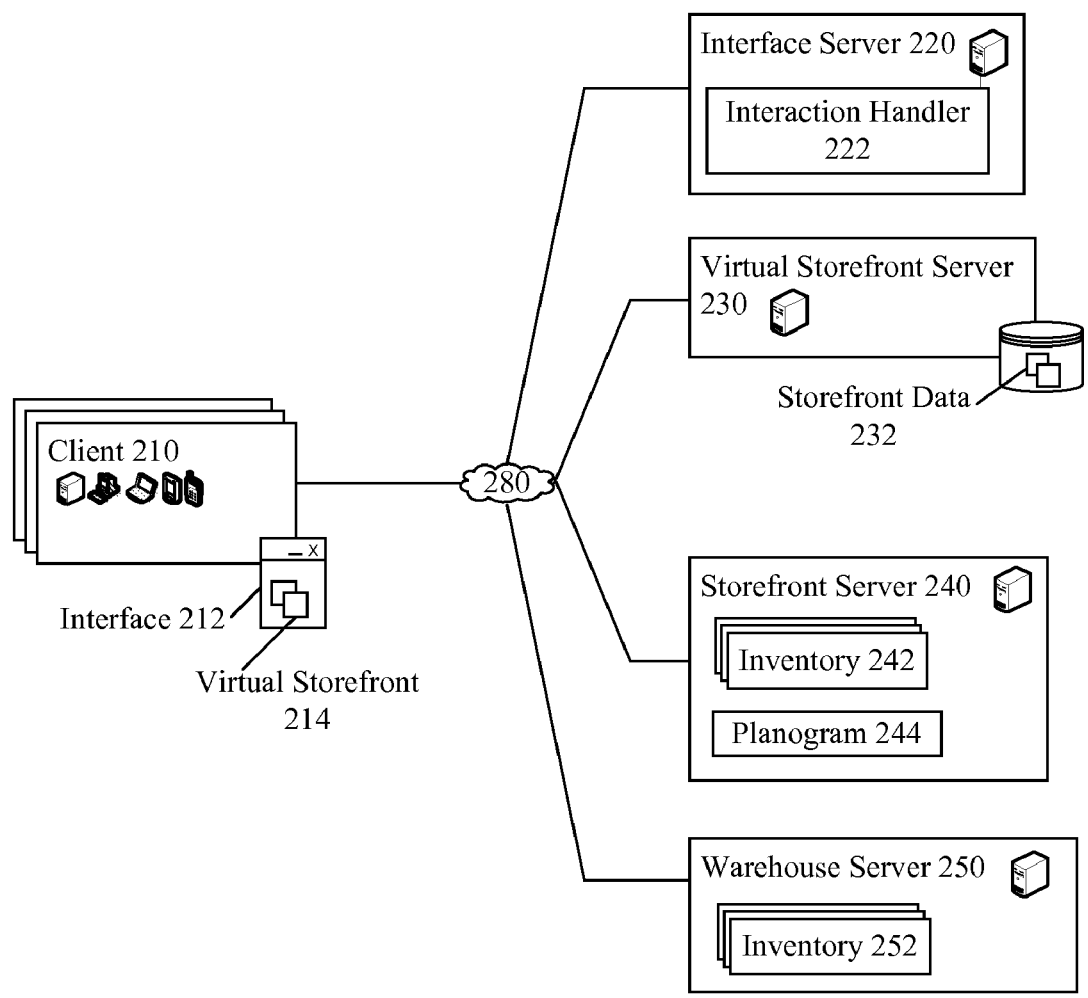
FIG. 2 is a schematic diagram illustrating a system for unifying virtual shopping and storefront shopping experiences in accordance with an embodiment of the inventive arrangements disclosed herein.

FIG. 2 is a schematic diagram illustrating a system 200 for unifying virtual shopping and storefront shopping experiences in accordance with an embodiment of the inventive arrangements disclosed herein. In system 200, servers 220-240 can enable a virtual storefront 214 to be presented on a client computing device 210. Physical storefront layout and organizational information can be stored within a planogram 244 in storefront server 240. Planogram 244 can be conveyed to storefront server 230 over network 280. Planogram 244 can be stored as storefront data 232, which can be utilized to create and present a virtual storefront 214. Virtual storefront 214 can be an virtual model of a physical storefront detailed in planogram 244. Interface 212 associated with a client 210 can enable a virtual storefront 214 to be utilized. For example, a shopper can interact with virtual storefront 214 through a storefront's Website allowing a similar experience as a physical storefront shopping.

As used herein, a planogram 244 can be a diagram or schematic indicating organizational information about a physical storefront. Planogram 244 can facilitate the automated generation of a virtual storefront model. Planogram 244 can include information including, but not limited to, aisle layout, kiosk location, product location, and the like. Other sources containing organizational information about a storefront can be combined with planogram 244 usage. In operation, planogram 244 can be an optional entity which can be substituted by one or more alternative sources which can be used to automatically generate a virtual storefront model.

It should be noted that use of planograms 244 to create storefront-specific layouts for corresponding virtual stores can be an efficient mechanism for creating multiple different virtual store-fronts. For example, a retailer having five thousand different storefronts can automate a generation of five thousand different virtual stores using planograms 244 combined with automatically obtained information. For example, intra-store inventory, storage containers, shelves, displays, registers, and other objects can be marked with RFID tags, which can automatically be detected by a series of in-store RFID sensors. From RFID readings, a location and identity of the various in-store objects can be obtained, which when combined with planogram 244 data provides an extremely realistic representation of the store. Another advantage of using planograms 244 and RFID obtained data is that as in-store modifications are made, such as moving display items, the changes can be automatically detected, which results in updates of a virtual store analog. Thus, virtual store-front layouts can be automatically maintained and updated to ensure that each reflects actual in-store changes.

A level of granularity in which a physical storefront is modeled by a planogram 244 can vary from implementation to implementation. Further, a planogram 244 can include static, semi-static and dynamic items, depending upon implementation specifics. For example, in one implementation, a basic layout of a physical storefront can be represented by a planogram 244, which can indicate in which aisles certain categories of items are located. In another implementation, the planogram 244 can include detailed inventory items and their location within a storefront. In still another implementation, the planogram 244 can include current storefront promotions, promotional displays, and the like. The planogram 244 can even include employees working in a storefront, customers present in a storefront, and the like.

Interface server 220 can present virtual store 214 within interface 212. Server 220 can convey virtual storefront 214 information over network 280 to a set of clients 210. In one embodiment, server 220 can be used to deliver a customized non-native interface 212 to client 210. In the embodiment, interface 212 can be controlled and/or managed by the distributor of virtual storefront 214. Server 220 can provide customized interface elements and/or functionality to be presented within interface 212. Elements can be selectively enabled or disabled based on capabilities of client 210 and/or interface 212. Elements can include graphical user interface elements, voice user interface elements, tactile interface elements, and the like. Further, server 220 can allow storefront 214 to be abstracted allowing presentation over heterogeneous interfaces. For example, storefront 214 can be presented seamlessly within an existing networked virtual world environment.

In one embodiment, interactions with storefront 214 can be managed by handler 222 which can communicate requests to virtual storefront server 230. For each client 210 and/or interface 212, a handler 222 can be utilized to receive storefront interaction 214. Storefront 214 interaction can be processed into requests which can be conveyed to server 230. In one embodiment, handler 222 can be an application programming interface (API) enabling virtual storefront 214 to be implemented within any client 210 and/or interface 212.

Virtual storefront server 230 can process interaction requests from handler 222 and convey the appropriate response to server 220. Storefront data 232 can provide organizational information about storefront 214 which can be used to enable interactions, which can include real-time interactions, with storefront 214. Server 230 can be used to track shopper presence within storefront 214, create and/or modify storefront 214, inventory available to virtual storefront shoppers, and the like. Further, server 230 can allow registration and identification of shoppers utilizing storefront 214. For instance, when a shopper first requests a virtual storefront 214, server 230 can register their presence within the system 200. In one embodiment, server 230 (or server 220 receiving information from server 230) can be an e-commerce server able to integrate with existing end-to-end shopping systems. Alternatively, server 230 can perform all e-commerce functionality without the aid of existing systems.

Storefront server 240 can be used to perform physical storefront awareness, which can be communicated to storefront 214. Server 240 can track inventory 242, manage in-store shoppers, track transient items, intra-store item pricing, and the like. In one embodiment, server 240 can be an existing storefront server associated with one or more physical storefronts. In the embodiment, storefront server 240 can provide storefront level information, which can be replicated within storefront 214. For example, special events occurring at selected stores can be presented to shoppers utilizing participating storefront 214. In one embodiment, the storefront server 240 can include a point of sale (POS) system, which links a unique inventory item (based upon bar code, RFID tag, or other identifier) to an in-store price. This in-store price can optionally be conveyed as part of the storefront data 232, which permits the prices of items of a virtual storefront to correspond to those of the related physical storefront, which is typically not the case for online shopping. In one embodiment, virtual shoppers can interact with and/or experience in-store special events, such as participating in an in-store chess tournament via interface 212 or receiving a video stream of a live performance occurring in-store. Further, inventory 242 can be presented within storefront 214, enabling storefront 214 shoppers to interact with in-store products.

Warehouse server 250 can provide information about non-storefront inventory 252. Inventory 252 can represent a ubiquitous pool of products which a virtual storefront 214 can present. Storefront server 230 can utilize data from server 250 to allow virtual storefront 214 shoppers to access inventory not available at the associated physical storefront. Inventory 252 can provide overflow capacity for physical storefronts with limited quantities of high demand products. For instance, when a product is in limited quantity in a physical storefront associated with storefront 214, products and/or quantities within inventory 252 can be presented.

Different embodiments exist depending upon a degree of connectivity desired between a virtual storefront 214 and a related physical storefront. In one embodiment, for example, a basic layout of a physical storefront (from server 240) can be used as storefront data 232 when establishing virtual storefront 214, while shoppers of interface 212 can have access to inventory 252, which can vary from inventory 242. For example, an inventory 252 available to e-commerce shoppers can often be significantly greater than an in-store inventory 242. Even when a low-level of granularity is used for storefront 214 (e.g., down to an item-level of a physical storefront), e-commerce purchases can be sent from a warehouse, and thus may not affect inventory 242. Additionally, each "shelf" of a virtual storefront 214 may have an option for "more" where inventory not present in a physical storefront, but included in available inventory 252 is presented.

In another implementation, inventory shown in a virtual storefront 214 can be limited to inventory 242 of an actual physical storefront. All shipping, pick-up events, and the like can be conducted from this physical storefront location and can be assisted by server 240. In such an embodiment, actual human workers in a storefront may be notified (via server 240) to remove physical objects from the storefront responsive to activities occurring in virtual storefront 214. Such actions may be necessary to ensure that virtually and physically conducted transactions involving limited inventory 242 do not exceed the capacity of the physical inventory 242 of a store. In such an implementation, shoppers of a virtual storefront 214 may make tentative purchases of a limited inventory 242, which are finalized when a physical agent of a physical storefront removes the electronically purchased item from availability within the storefront. In another contemplated embodiment, automated systems can be used to remove items from a physical storefront responsive to activities occurring within a related virtual storefront 214.

Hybrid implementations are contemplated, where interactions within a virtual storefront 214 may involve inventory 242 and inventory 252. For example, pick-up orders can be restricted to a physical inventory 242, while shipped orders can be related to inventory 252. In one embodiment, a storefront server 240 can be involved in transactions occurring through a virtual storefront 214 regardless of whether inventory 242 and/or 252 is utilized to satisfy an order made through a virtual storefront 214. Thus, orders of either a physical or virtual storefront can be processed through a storefront's system, which can have positive effects on scaling, can incentivize physical storefronts to positively interact/dedicate resources (e.g., employees) to helping virtual shoppers, and the like.

Drawings presented herein are for illustrative purposes only and should not be construed to limit the invention in any regard. Servers 220-250 can be optional components providing functionality of system 200 is preserved. For example, storefront server 240 can be excluded from system 200 provided storefront data, such as a planogram 244 is provided to virtual storefront server 230. In another example, server 220 can be omitted, and virtual storefront server 230 can be a Web server providing Web content rendered in interface 212.

In one embodiment, virtual storefront server 230 can provide data to one or more sources to accurately represent storefront transactions in a virtual computing space, which are specifically designed not to affect an actual physical storefront, other than potentially providing a revenue stream to the storefront for providing valuable simulation data. For instance, a SECOND LIFE server (e.g., server 220) can utilize data from actual physical storefronts to accurately model a virtual world in a self-updating manner, where transactions occurring during SECOND LIFE game play are not sent to server 240 or server 250. For example, a bookstore in SECOND LIFE modeled after a physical storefront can receive inventory updates, promotional updates, and the like from an actual storefront, which permits a simulation to be accurately maintained in a highly efficient manner. Thus, virtual storefront 214 interactions do not necessarily have to have a bidirectional affect on a physical storefront.

In one embodiment, functionality presented herein can be consolidated within existing infrastructures enabling integration with established systems. This consolidation can be part of a unified effort or can be provided as a value-added service for one or more institutions. For example, system 200 functionality can be encapsulated within a middleware software solution, such as WEBSPHERE. Connectors can be established to permit the middleware solution to interact with different front-end interfaces and back-end infrastructures.

Further, the front-end and back-end infrastructures can be owned, maintained, and managed by different business entities. For example, an e-commerce retailer can present virtual storefronts mirroring a physical storefront even though the both are separate establishments. For instance, an online only retailer and a physical storefront business having no organic on-line presence can mutually benefit by cooperating in accordance with system 200 details. In another embodiment, a third party can provide an online presence using virtual storefronts 214 for a physical storefront 240 for a service fee.

Figure 3:
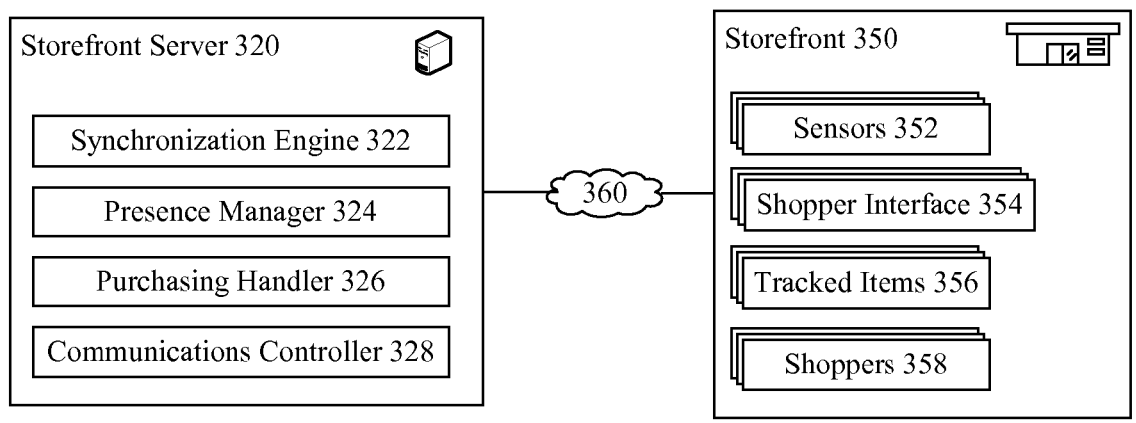
FIG. 3 is a schematic diagram illustrating a system for enabling a unified virtual storefront and physical storefront experience in accordance with an embodiment of the inventive arrangements disclosed herein.

FIG. 3 is a schematic diagram illustrating a system 300 for enabling a unified virtual storefront and physical storefront experience in accordance with an embodiment of the inventive arrangements disclosed herein. System 300 can be present in the context of system 200. In system 300, a storefront server 320 can facilitate a consistent virtual storefront shopping and physical storefront shopping experience. Information from storefront 350 components can be conveyed to server 320 over network 360. Server 320 can process information and events to enable a virtual storefront to be presented.

Sensors 352 located within the storefront 350 can provide information about tracked items 356 and shoppers 358. Sensors 352 can include, but are not limited to, radio frequency identification (RFID), cameras, thermal sensors, biometric sensors, motion detectors, pressure sensors, and the like. Sensors 352 can be positioned in storefront 350 to enable tracking throughout the storefront 350. In one embodiment, RFID transponders can be placed in products which sensors 352 can identify and track. For example, sensors 352 can track transient items such as products in a shopping carts and/or products being carried by shoppers. The sensors 352 can provide an efficient, easy to maintain, and highly responsive (e.g., updated can occur in real-time in some implementations) mechanism to maintain a correspondence between in-store activities and changes and those of a related virtual store.

Shopper interface 354 can enable interaction between storefront shoppers and virtual storefront shoppers. Interface 354 can be located within storefront 350 and can include, but are not limited to, kiosks, smart carts, and the like. Shopper interface 352 can permit communications, which includes real-time, near real-time, and/or non real-time communications depending upon implementation choices, to be achieved between shoppers in storefront 350 and in virtual storefronts. Shopper interface 354 can optionally be used to track shoppers 358 through storefront 350. Communications can also be queued and selectively presented to detected shoppers 358 at an appropriate time and place. For example, a shopping list can be conveyed by a spouse using a computer to an in-store counterpart. This shopping list can be displayed on an electronic display of a shopping spouse's cart, can be compared against items purchased at a point of sale device (with notifications being presented at the point of sale device for missed or non-corresponding items), and the like.

Tracked items 356 can allow server 320 to mirror storefront 350 changes to a virtual storefront. Items 356 can include storefront products, shopping carts, shoppers 358, storefront 350 employees, kiosks, and the like. When tracked items 356 are moved, sensors 352 can identify the item and convey information about the item change to server 320. For example, if a store kiosk is moved to a different location in the storefront 350, the server 320 can replicated the change in the associated virtual storefront.

Shoppers 358 can be customers located within storefront 350. Shoppers 358 can be identified by utilizing information gathered from one or more sources. Sources can include customer reward card, RFID capable devices, kiosks, and the like. Recognition techniques can include speaker identification verification (SIV), a recognition analysis from captured video, and the like. In one embodiment, speech characteristics and/or visual attributes of a shopper 358 can be captured and replicated for a corresponding avatar, which represents that shopper 358 in a corresponding virtual storefront. Shopper 358 identity, location, and shopping behavior can be utilized by server 320 to represent shoppers within a virtual storefront.

Synchronization engine 322 can enable storefront 350 activity to be replicated to an associated virtual storefront. Engine 322 can utilize a polling mechanism which can identify changes within storefront 350 based on polling intervals. Alternatively, engine 322 can utilize a push/pull mechanism for retrieving updates from storefront 350. Additionally, engine 322 can be used to maintain synchronization between physical storefront inventory and inventory available to virtual storefront shoppers. In one embodiment, when a tracked product is removed from a physical storefront shelf, engine 322 can update available products presented in a virtual storefront to reflect the removed product. Other changes, such as changes in product pricing, can similarly be reflected in the virtual storefront. In the embodiment, engine 322 can update the underlying available product information within virtual storefront without a shopper being aware a change has occurred. Alternatively, virtual storefront shoppers can be notified when product availability has changed.

Integration with a point of sale system in the storefront 350 can be a significant embodiment. To elaborate, retailers often have different prices between stores and/or between a warehouse location for a variety of reasons (e.g., Shop X has more milk approaching expiry date than Shop Y, so Shop X will run a sale while Shop Y will not). Integration of the point of sale system with the virtual store permits a shopper 358 in the virtual storefront to see and receive the same price as that of a shopper in the physical storefront 350. In one embodiment, pricing information for the virtual store can be dynamically generated and/or hidden from Web crawlers, which prevents store specific pricing information from being available to price comparison engines. This can be significant to maximize profits by permitting different virtual stores to charge different amounts for a common product. In one embodiment, when a virtual shopper 358 makes a purchase, the actual transaction can be reflected in the point of sale system of the physical storefront.

Presence manager 324 can identify and track shoppers 358 throughout storefront 350. Manager 324 can relay presence information to shopper interface 354 and/or interfaces presenting a virtual storefront. Manager 324 can be used to track shoppers 358 behaviors, including but not limited to, time of entry, time of exit, duration spent at a location, and the like. Information gathered from manager 324 can be conveyed in to a virtual storefront enabling a virtual storefront shopper to be presented with a real-time view of a physical storefront.

Purchasing handler 326 can enable shoppers 358 to purchase storefront 350 products. Utilizing interface 354 shoppers can access products not located in storefront 350 which can be purchased although products are not local to the storefront 350. In one embodiment, handler 326 can be associated with a point-of-sale system located in storefront 350. In the embodiment, handler 326 can allow virtual storefront shoppers to purchase products in a similar fashion as storefront 350. In the embodiment, handler 326 can utilize retail transaction interface (RTI) technology to enable virtual storefront and physical storefront integration. Handler 326 can be used to convey physical storefront sales promotions to virtual storefronts. Promotions can include sale pricing, promotional offers, product rebates, and the like.

Communications controller 328 can allow real-time communication to occur between shoppers 358 and virtual storefront shoppers. Further, controller 328 can permit real-time communications between shoppers 358 in storefront 350. Controller 328 can facilitate communications including text exchange, voice communication, and the like. Controller 328 can be used to convey relevant physical storefront announcements (e.g., public address) to virtual storefront shoppers.

Figure 4:
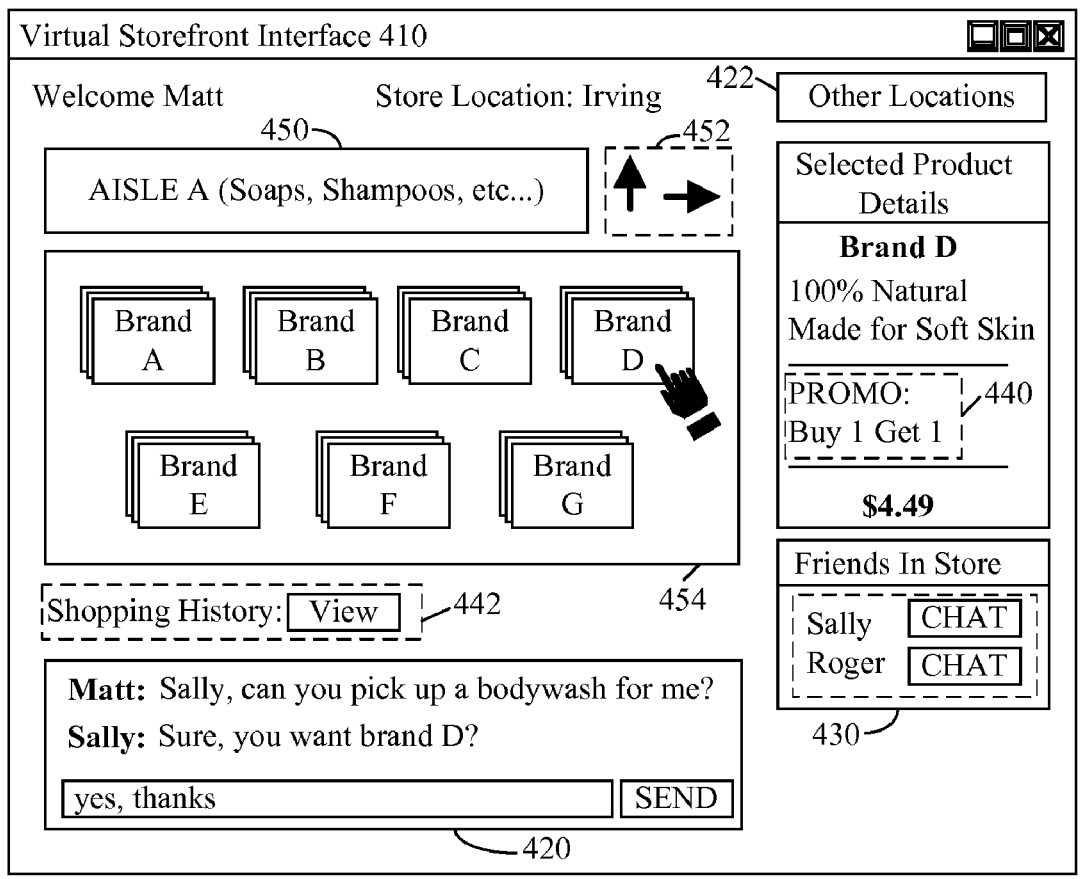
FIG. 4 is a schematic diagram illustrating an interface for facilitating unified virtual storefront and physical storefront shopping experiences in accordance with an embodiment of the inventive arrangements disclosed herein.

FIG. 4 is a schematic diagram illustrating an interface 410 for facilitating unified virtual storefront and physical storefront shopping experiences in accordance with an embodiment of the inventive arrangements disclosed herein. Interface 410 can be presented in the context of system 200. In interface 410, visually presentable artifacts 420-454 can enable a shopper to interact with a virtual storefront in a similar manner to that of shoppers in a physical storefront. Artifacts 420-454 can be conditionally presented based on shopper's interaction, interface states, shopper location within the virtual store, pending communications, and the like. For instance, physical storefront promotions 440 can be presented based on a product which has been selected.

Virtual store interface 410 can vary between the physical storefronts which they are representing. For instance, a physical storefront can neglect to provide shopping history 442 for shoppers resulting in element 442 to be suppressed. Further, interface 410 can be configured to appear using themes/styles based on physical storefront and/or corporate policies. For example, an interface layout for a Chicago storefront can be different from a Florida storefront. Layout changes can be customized to facilitate, seasonal changes, sales promotions, special events, shopper usability behaviors, and the like.

Shoppers utilizing interface 410 can be presented with interface elements which can mimic the physical storefront shopping experience. Interface can include elements such as location element 450, navigation elements 452, and product presentation element 454. Location element 450 can present relevant shopper with virtual storefront location information including, but not limited to, aisle information, department information, and the like. Navigation elements 452 can permit a shopper to navigate through the virtual storefront in a manner similar to physical storefront shopping. For example, elements 452 can permit Matt to browse "Aisle A" by utilizing the "up arrow" icon. Element 454 can present products located on shelving associated with the location within the physical storefront. For example, element 454 can display products on a segment of shelving in "Aisle A". In one embodiment, element 454 can present products available from company warehouses in addition to products located in the physical storefront.

Based on shopper geographical location, interface 410 can automatically present a shopper with a virtualized local storefront. Location information can be gained from presence information, shopper settings, shopper input, and the like. Alternatively, shopper settings location preferences can determine the most appropriate store to be automatically selected. Store location information can be gathered from shopping habits (e.g., most frequented store), sales promotions, and the like. For instance, when a shopper inputs the storefront's Web site address, the shopper can be redirected to a virtualized version of their favorite local store.

Shoppers can be permitted to manually select a virtualized store through interface artifact 422. Artifact 422 can present a shopper with available virtualized stores which can be presented. In one embodiment, artifact 422 can enable a shopper to search within a subset of virtual stores. For instance, if a product is not available for in-store pickup at the Irving store, the shopper can interact with button 422 to automatically find the nearest physical store where the product is available for in-store pickup.

Leveraging shopper identification and presence information, interface 410 can allow shoppers to interact in real-time, near real-time, or through messages having an appreciable delay (e.g., email, voicemail, etc.). Interface element 430 can present a virtual storefront shopper with other shoppers located in the physical storefront. Additionally, shoppers located in different storefronts and virtual storefronts can be presented. Element 430 can be customizable enabling categorization and organization of shoppers into groups. Further, interface 410 can utilize social networking lists, contact lists, and the like to automatically discover shoppers of interest who can be presented in the interface 410.

Shoppers interacting with the virtual storefront interface can be permitted to communicate with shoppers in the physical storefront through interface element 420. Element 420 can include a text-exchange interface, an voice interface, a co-browsing interface, a two-way radio interface, an email interface, etc. enabling shoppers to communicate. For instance, a virtual store shopper Matt can chat with his friend Sally, who is shopping in the physical storefront. In one embodiment, speech processing technologies, translation technologies, and the like can facilitate communications with people utilizing different interface modalities and/or communicating in different languages.

Shopping history element 442 can allow a virtual store shopper to quickly locate previously purchased products. Element 442 can present the shopper with information about previously inspected products, product availability based on history, and the like. Element 442 can permit a virtual store shopper to convey previous products of interest to physical storefront shoppers.

Drawings presented herein are for illustrative purposes only and should not be construed to limit the invention in any regard. Artifacts 420-454 can be presented or suppressed based on shopper interaction, configuration settings, virtual storefront settings, physical storefront settings, and the like. Functionality attributed to artifacts 420-452 can be presented using one or more graphical elements including, but not limited to, context menus, pull-down menus, dialog boxes, and the like. Interaction with interface 410 can be admin/shopper configurable and can include interactions such as single click, double click, drag and drop, multiple select, and the like.

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for virtualizing a physical storefront comprising:
    presenting an interactive virtual model of a physical storefront within a user interactive interface of a computing device remotely located from the physical storefront, wherein at least a portion of the organizational structure of the interactive virtual model is identical a portion of the organizational structure of the physical storefront, wherein said organization structure varies from storefront-to-storefront of different physical storefronts, each being related to a different interactive virtual model;
    sensing, via computer program instructions executed by a processor, a change involving at least one physical object within the physical storefront;
    responsive to sensing the change, changing, via computer program instructions executed by a processor, a virtual object presented in the interactive virtual model so that the change to the physical object occurring in the physical storefront is reflected in the interactive virtual model and is shown in the user interactive interface; and
    sensing, via computer program instructions executed by a processor, a presence and identity of physical shoppers present in the physical storefront;
    indicating, via computer program instructions executed by a processor, the presence and identity of the physical shoppers in the user interactive interface; and
    presenting within an in-store kiosk a kiosk user interface usable by the physical shoppers, said kiosk user interface presenting a presence and identity of the physical shoppers and at least one virtual shopper interacting via the interactive virtual model.

2. The method of claim 1, wherein said user interactive interface is a first interactive user interface and wherein said computing device is a first computing device, said method further comprising:
    presenting an interactive virtual model of the physical storefront to a second shopper within a second user interactive interface of a second computing device remotely located from the physical storefront; and
    responsive to sensing the change, changing via computer program instructions executed by a processor, a virtual object presented in the interactive virtual model so that the change to the physical object occurring in the physical storefront is reflected in the interactive virtual model and is shown in the second user interactive interface.

3. The method of claim 2, further comprising:
    sensing, via computer program instructions executed by a processor, a change involving at least one virtual object made via the first user interactive interface; and
    responsive to sensing the change, changing via computer program instructions executed by a processor, a virtual object presented in the second interactive interface so that the change to the virtual object occurring in the first user interactive interface is reflected in the second interactive interface.

4. The method of claim 2, further comprising;
    indicating, via computer program instructions executed by a processor, a presence and identity of a first user utilizing the first user interactive interface within the second user interactive interface;
    indicating, via computer program instructions executed by a processor, a presence and identity of a second user utilizing the second user interactive interface within the first user interactive interface; and
    providing, via computer program instructions executed by a processor, a communication facility within the first user interactive interface and within the second user interactive interface, wherein the communication facility permits the first user and the second user to communicate with each other.

5. The method of claim 2, further comprising:
    indicating, via computer program instructions executed by a processor, a presence and identity of a first user utilizing the first user interactive interface within the second user interactive interface;
    indicating, via computer program instructions executed by a processor, a presence and identity of a second user utilizing the second user interactive interface within the first user interactive interface; and
    determining, via computer program instructions executed by a processor, a first location of the first user relative to the interactive virtual model of a physical storefront based upon interactions with the first user interactive interface;
    determining, via computer program instructions executed by a processor, a second location of the second user relative to the interactive virtual model of a physical storefront based upon interactions with the second user interactive interface;
    presenting within the first user interactive interface an identifier showing the detected second location, which indicates that the second user is associated with the second location; and
    presenting within the second user interactive interface an identifier showing the detected first location, which indicates that the first user is associated with the second location.

6. The method of claim 1, wherein the user interactive interface is an e-commerce interface through which commercial transactions are able to be conducted.

7. The method of claim 6, wherein items available for purchase in the physical storefront are presented within the user interactive interface and are able to be purchased through the user interactive interface, where purchase transactions made via the user interactive interface are conducted using a purchasing computing system, wherein purchases made in the physical storefront are conducted using the purchasing computing system.

8. The method of claim 1, further comprising:
    providing, via computer program instructions executed by a processor, a communication facility within the user interactive interface through which a user of the user interactive interface is able to communicate with a selected one of the physical shoppers.

9. The method of claim 1, further comprising:
utilizing, via computer program instructions executed by a processor, pricing information of a point of sale system of the physical storefront to set prices of items presented in the interactive virtual model of the physical storefront, wherein the interactive virtual model is a virtual world comprising a simulation of said physical storefront that is a virtual storefront, wherein physical storefront to virtual storefront interactions have a unidirectional affect where interactions with the virtual world via the virtual storefront do not affect the physical storefront.

10. The method of claim 1, further comprising:
transacting ecommerce purchases of items, via computer program instructions executed by a processor, made through a user interface that presents the interactive virtual model using a point of sale system of the physical storefront, wherein said point of sale system is used for sales made within the physical storefront, wherein ecommerce transactions made via the user interface are reflected in the point of sale system of the physical storefront.

11. The method of claim 1, further comprising:
indicating, via computer program instructions executed by a processor, the presence and identity of human employees located in the physical storefront in the user interactive interface; and
providing, via computer program instructions executed by a processor, a communication facility within the user interactive interface through which a user of the user interactive interface is able to communicate with a selected one of the human employees.

12. The method of claim 1, further comprising:
detecting, via computer program instructions executed by a processor, a presence and location of a virtual shopper utilizing the user interactive interface relative to the interactive virtual model of a physical storefront based upon interactions with the user interactive interface;
conveying, via computer program instructions executed by a processor, the presence and location to at least one user of a computing device other than the computing device associated with the user interactive interface.

13. The method of claim 1, wherein the user interactive interface comprises a graphical user interface that renders a three-dimensional representation of the physical storefront, wherein the user interactive interface displays avatars for humans associated with the physical storefront within the graphical user interface, wherein interactions are permitted between a user of the user interface and the avatars, which results in communications being established between the user and a human corresponding to the avatar to which the interactions are directed.

14. The method of claim 1, wherein the interactive virtual model is a virtual world comprising a simulation of said physical storefront that is a virtual storefront, wherein physical storefront to virtual storefront interactions have a unidirectional affect where interactions with the virtual world via the virtual storefront do not affect the physical storefront.

15. The method of claim 1, wherein the organizational structure of the interactive virtual model is constructed at least in part from a planogram of the physical storefront, wherein the planogram indicates a plurality of fixed and movable entities within the physical storefront, wherein information from additional sources about the physical storefront is combined with the planogram to create the virtual model, wherein said additional sources comprises RFID readings obtained from RFID tagged in-store objects.

16. A non-transitory computer program product for virtualizing a physical storefront comprising a computer readable storage medium having computer usable program code embodied therewith, the computer program product comprising:
computer readable program code recorded on a computer-readable medium configured to present an interactive virtual model of a physical storefront within a user interactive interface of a computing device remotely located from the physical storefront, wherein at least a portion of the organizational structure of the interactive virtual model is identical a portion of the organizational structure of the physical storefront, wherein said organization structure varies from storefront-to-storefront of different physical storefronts, each being related to a different interactive virtual model;
computer readable program code recorded on a computer-readable medium configured to sense a change involving at least one physical object within the physical storefront;
computer readable program code recorded on a computer-readable medium configured to, responsive to sensing the change, change a virtual object presented in the interactive virtual model so that the change to the physical object occurring in the physical storefront is reflected in the interactive virtual model and is shown in the user interactive interface;
configured to sense a presence and identity of physical shoppers present in the physical storefront;
computer readable program code recorded on a computer-readable medium configured to indicate the presence and identity of the physical shoppers in the user interactive interface; and
computer readable program code recorded on a computer-readable medium configured to present within an in-store kiosk a kiosk user interface usable by the physical shoppers, said kiosk user interface presenting a presence and identity of the physical shoppers and at least one virtual shopper interacting via the interactive virtual model.

17. A system for virtualizing a physical storefront comprising:
a physical storefront server configured to identify a shopper within a physical storefront, wherein information associated with the identified shopper is conveyed to an interface presenting a virtual storefront;
a virtual storefront server able to identify a shopper utilizing a virtual storefront, wherein the virtual storefront is a virtual model of the physical storefront;
an interface server configured to present the virtual storefront within a user interface of a computing device to a virtual shopper, wherein the computing device is remotely located from the physical storefront, and wherein information about the shopper identified by the physical storefront server is presented within the user interface;
a sensor configured to sense a presence and identity of physical shoppers present in the physical storefront; and to indicate the presence and identity of the physical shoppers in the user interactive interface; and
an in-store kiosk configured to present, via a user interface usable by the physical shoppers, a presence and identity of the physical shoppers and at least one virtual shopper interacting via the interactive virtual model.

18. The system of claim 17, further comprising:

a plurality of sensors, each associated with a physical object of the physical storefront, wherein said physical object comprises at least one of a for-purchase item and a display object associated with at least one for-purchase item, wherein said physical storefront server is configured to automatically detect a location of each of the sensors within the physical storefront and to associate the detected location with a location of the associated physical object, wherein said physical storefront server is configured to convey sensed location data of the physical objects to the virtual storefront server, wherein the virtual storefront server is configured to update a virtual location of virtual objects in the virtual storefront corresponding to the physical objects in accordance with the sensed location data received from the physical storefront server.

19. The system of claim 18, further comprising:

a communication server configured to enable real-time communications between the shopper and the virtual shopper, wherein said virtual shopper conducts the real-time communications using the user interface within which the virtual storefront is presented.

* * * * *